Patented Jan. 11, 1949

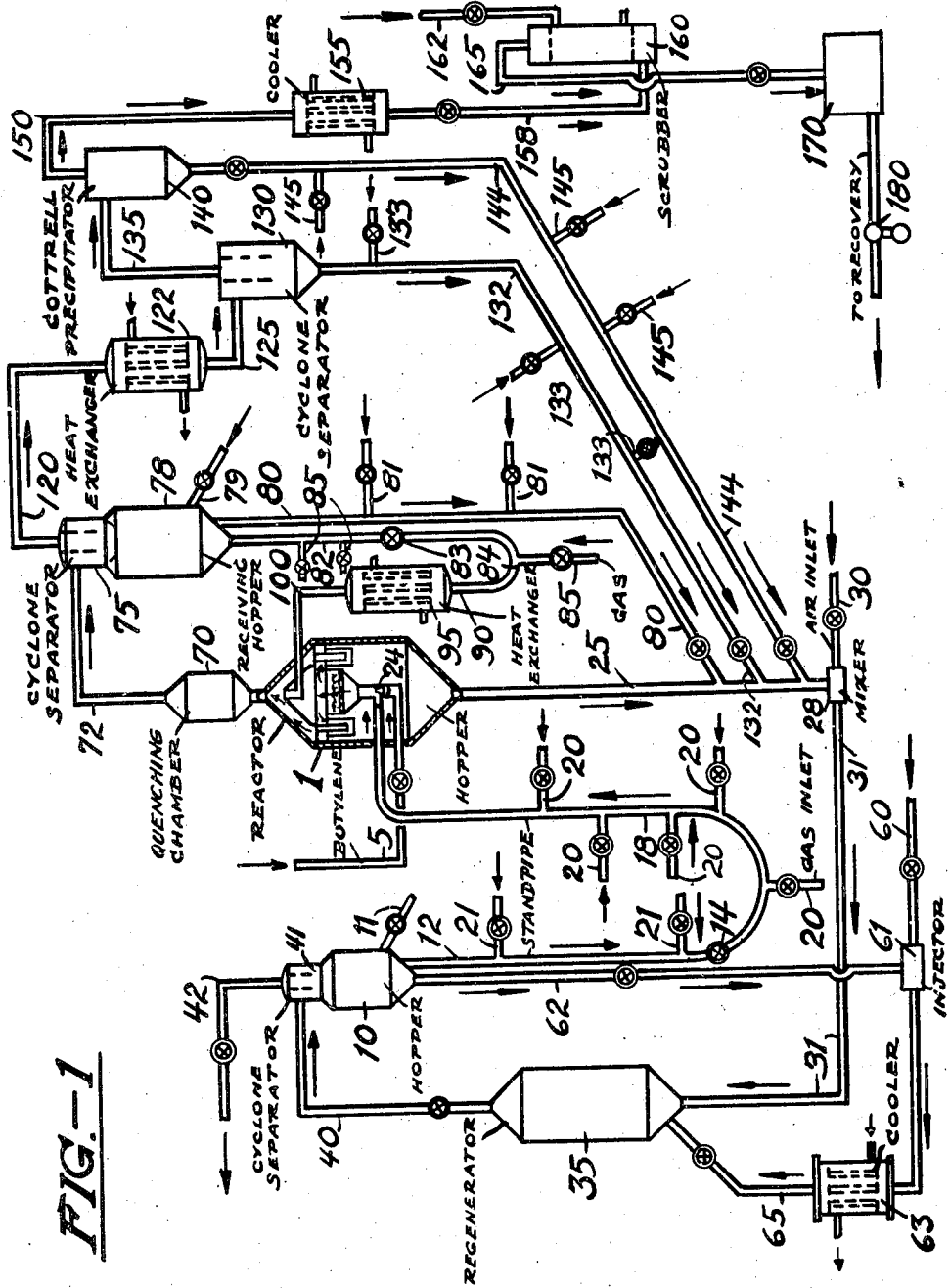

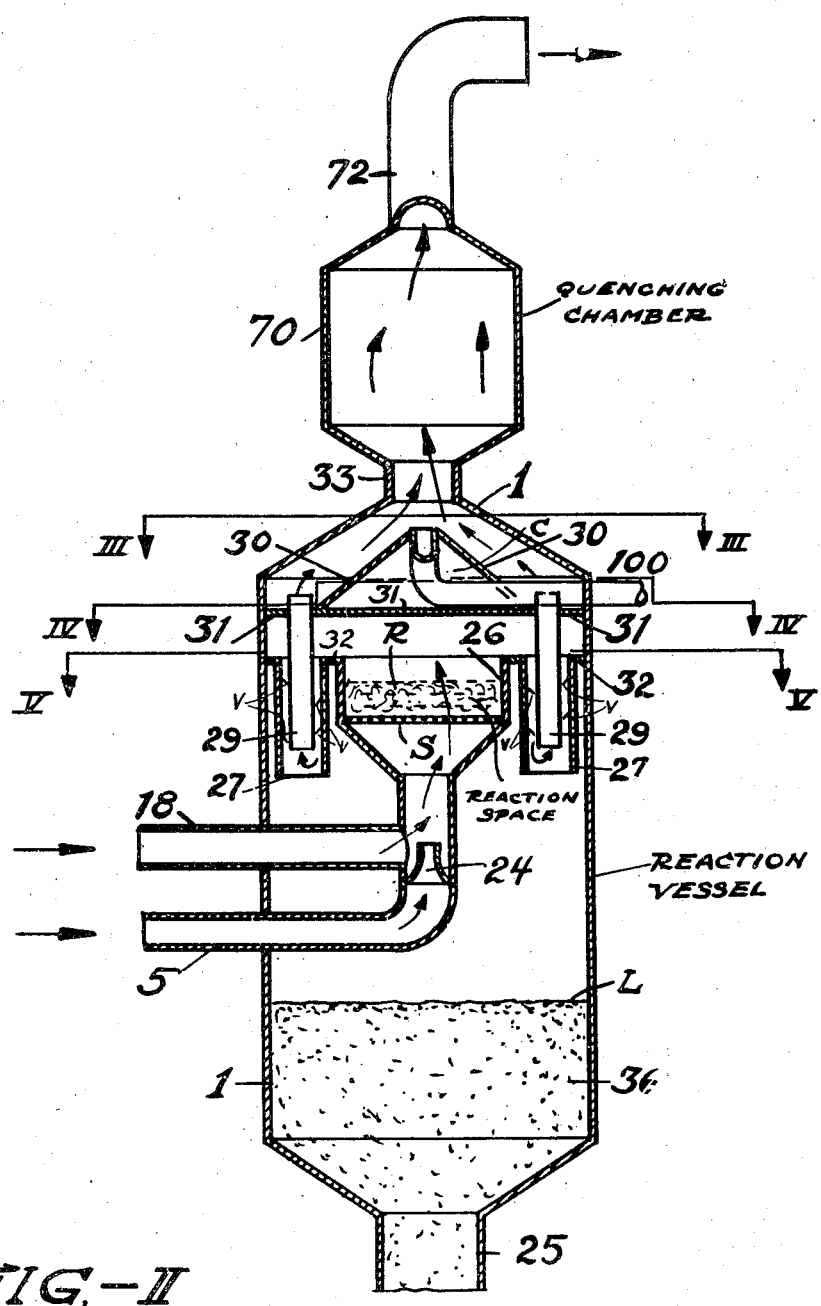

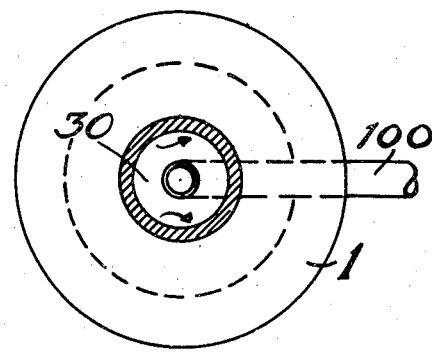
FIG.—III
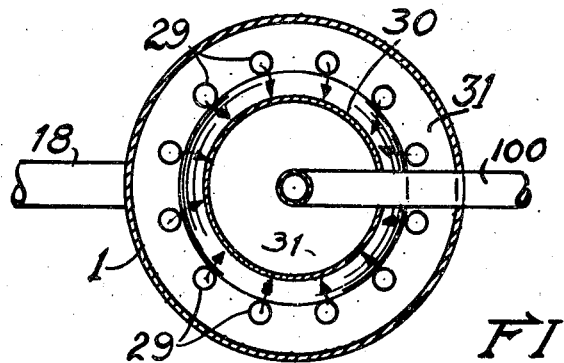
FIG.—IV
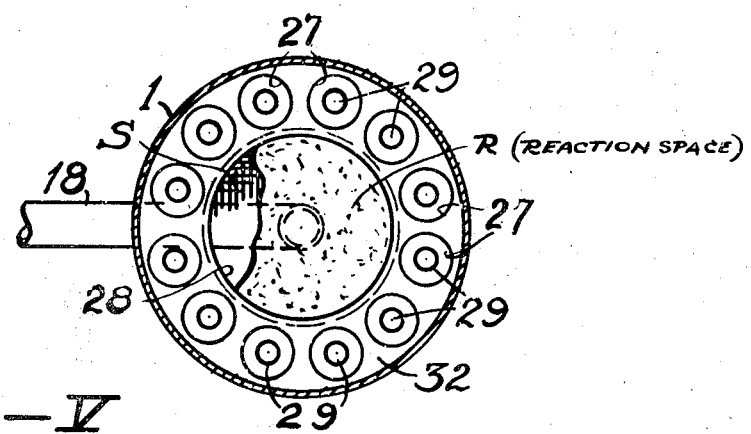
FIG.—V

2,458,960

UNITED STATES PATENT OFFICE 2,458,960

APPARATUS FOR REACTIONS REQUIRING SHORT CONTACT TIME

Bruno E. Roetheli, Cranford, and Walter G. Scharmann, Westfield, N. J., assignors to Standard Oil Development Company, a corporation of Delaware Application November 28, 1942, Serial No. 467,162

4 Claims. (Cl. 23—288)

1

This application is a continuation-in-part of our prior application, Serial Number 407,550, filed August 20, 1941, entitled "Chemical process," now United States Letters Patent No. 2,376,190, granted May 15, 1945.

The present invention relates to improvements in the art of controlling the time or duration of a chemical reaction accurately within narrow limits by quenching the reaction mass with a cooler solid substance.

There are a number of chemical reactions in which the time or duration of the reaction is of the essence. For example, in the catalytic dehydrogenation of hydrocarbons, such as the dehydrogenation of butylene to form butadiene, it is known that the optimum contact time between catalyst and reaction mass at reaction temperatures is of the order of less than one second at subatmospseric pressures. In contact times of the order indicated, the production of butadiene is at a maximum and the formation of undesired decomposition products is at a minimum.

In operating with a fixed bed of catalyst, that is to say, in operating a process in which the reaction gases pass through a body of catalyst in the form of pellets or lumps, it is exteremely difficult by any feasible method to limit the contact times to the degree indicated above, namely, to a fraction of a second. In any event, it is difficult to maintain all portions of reaction mixture in contact with the catalyst for such a short period of time because appreciable time is consumed by those molecules of the reactants which diffuse into the aggregates of catalyst particles of the size employed in fixed beds, and are released therefrom. In other words, while those molecules which contact merely the surface of the catalyst pills or pellets may be subjected to the influence of catalyst for a relatively short period of time, those molecules which actually penetrate into the body of catalyst are in contact with the catalyst for a period of time which is usually sufficient to cause the formation of undesired products with a consequent loss in yield of the desired products.

In order to overcome the foregoing and similar disadvantages, we have devised means for limiting chemical reactions carried out catalytically to short periods of contact time between catalyst and reactant, and we accomplish this end essentially by quenching the reaction mixture with catalyst which is cooler than the said mixture.

The main object of our invention is to control contact time between a gaseous reactant and a catalyst for the reaction by the use of finely divided catalyst and quenching the reaction when the equilibrium is most favorable for the desired product by adding cooled catalyst to the reaction mass.

2

Another important step in our invention is to feed catalyst to the reaction zone by means of an up-flow standpipe, the details of which will be more fully described hereinafter.

A further object of our invention is to provide a process and suitable means therefor, whereby we may continuously perform vapor phase reaction in the presence of a powdered catalyst, provide means for regenerating the catalyst, and provide other means for returning the regenerated catalyst to the reaction zone to maintain continuity of operation, optimum temperature and pressure conditions and, finally, provide optimum contact times between reactant and catalyst at reaction temperatures.

In order to illustrate our invention and for the purpose of disclosing more fully its nature and purpose, we have shown in the accompanying drawings, diagrammatically, a form and arrangement of apparatus elements in which our invention may be applied to butylene dehydrogenation. Thus, in Fig. I we have shown a complete flow diagram which discloses in connection with the specification a preferred modification of our invention; in Fig. II there is shown an enlarged detail sectional view of our improved reactor; Fig. III is a section taken along the line III—III of Fig. II; Fig. IV is a section taken through the line IV—IV of Fig. II; and Fig. V is a cross-section view taken through the line V—V of Fig. II. Throughout the views similar reference characters refer to similar parts.

Referring in detail to Fig. I, 1 represents generally a reaction vessel. The construction of our improved reactor is shown in detail in Fig. II and will be subsequently described in detail. Catalyst in the form of powder having a particle size of from 200–400 mesh is discharged into the reactor 1 from hopper 10 in a manner as will be presently explained. The hopper 10 contains an active dehydrogenation powdered catalyst preferably in a heated condition and is in communication at its lower end with a standpipe 12 projecting downwardly as shown. This pipe may be of any convenient dimension such as 36 inches in internal diameter, and a vertical length of 40–60 ft. These dimensions are purely illustrative and are governed by the quantity of catalyst to be fed to the reactor 1 in any particular case. The lower end of the pipe is provided with a control valve 14 which is adapted to control the rate of flow by gravity of powder in pipe 12 into the upwardly extending standpipe 18 which projects, as shown, into reactor 1. In other words, the feed of catalyst to the reactor 1 is through a down-flow pipe 12 and an up-flow standpipe 18. This flow may be accomplished by regulating the densities in pipe 12 and 18 respectively, and by selecting the proper pipe dimensions, coupled with the introduction of fluidizing gas as follows. First, to cause catalyst to flow freely in pipe 12 a fluidizing gas is injected therein through pipes 21. By the same token to fluidize the catalyst in pipe 18, gas is injected through pipes 20. It is deemed obvious that by making pipe 18 of smaller internal diameter than pipe 12, the gas velocity in pipe 18 will be greater than that in pipe 12 and hence the density in pipe 18 will be less. Hence, catalyst will flow by the means indicated in the indicated direction. It is to be understood that the amount of gas injected into pipe 12 is much less than that injected into pipe 18, say one-fourth as much or less.

There is also discharged into the reactor a quantity of butylene, this material being supplied through line 5. The catalyst and the butylene are mixed in mixing device 24, and the mixture is then caused to flow upwardly in the reactor. The temperature of the gas in line 5 entering the reactor is about 1000° F., while the catalyst in line 18 is at a temperature of about 1350° F. The gas and catalyst are mixed in proportions such that the temperature of the mixture is about 1250° F., with most catalysts and we prefer to maintain a density of the suspension in the region just above the mixing device 24 of from about 5–15 lbs./cu ft., which condition is attained by regulating the gas velocities between 2 and 10 ft. per second where the catalyst particle size is from 200–400 mesh. Also a gas pressure of about 190 mm. of mercury is preferred within the reactor in the reaction now in question.

Under the conditions stated, the reaction occurs to form, ordinarily, butadiene from normal butylene, and then by means which will be explained more fully hereinafter, the bulk of catalyst is separated from the reaction mass and gravitates from the bottom of the reactor from which it is withdrawn through standpipe 25, mixed with air in a mixing device 28, the air entering through line 30, and thence conveyed through pipe 31 into a regenerator 35. The dimensions of regenerator 35 and the gas velocities are such that when the catalyst is mixed with the required amount of air or other free oxygen-containing gas, the density of the mixture is from about 5 to 15 lbs./cu. ft. The catalyst in line 25 is at a temperature of about 1000° F.–1200° F., and under these conditions when mixed with air at ordinary atmospheric temperature in mixer 28 active combustion takes place in regenerator 35 with the consumption of carbonaceous deposits produced on the catalyst as a result of the reaction taking place in reactor 1. Ordinarily it is preferable to operate regenerator 35 under superatmospheric pressure, say pressures up to 1–5 lbs./sq. in. gauge or higher, as dictated by economic considerations, in order to accelerate the oxidation of the contaminating carbonaceous material. The flue gas and the regenerated catalyst are withdrawn from the regenerator through line 40 and discharged into a cyclone separator 41 built into the top of hopper 10. The separator effects separation of the regenerated catalyst from the flue gas, and the latter is withdrawn through line 42 and if desired sent to a second cyclone separator to remove further quantities of catalyst. In some cases, it is desirable to employ three cyclones or even more to insure complete removal and recovery of catalyst from flue gas. The hot flue gases substantially freed of catalyst may then be passed through a waste heat boiler to recover a portion of their energy content. The catalyst separated in cyclone separator 41 gravitates into hopper 10 and is recycled to the reactor in the manner previously described. To promote the flowability of powder from hoppers 10, and 78, subsequently referred to, a fluidizing gas such as flue gas is discharged into said hoppers through pipes 11 and 79, respectively.

In the drawing, we have shown means for controlling the regeneration temperature of the catalyst in regenerator 35. As shown, catalyst, that is regenerated catalyst, may be withdrawn from hopper 10 through line 62, mixed with air from line 60 in injector 61, thence discharged through cooler 63 and line 65 into regeneration vessel 35. The cooled regenerated catalyst may be at a temperature of say 300–500° F. as it enters the regenerator, and may be in the proportions of say $1/30$–2 or more parts by weight of regenerated catalyst per part of unregenerated catalyst. The cooled regenerated catalyst serves to temper the exothermic reaction by absorbing heat released during regeneration.

Referring again to reactor 1, it will be noted that a second chamber 70 is superimposed at the top of reactor. This chamber contains the reaction products and catalyst added to quench the reaction mixture. The manner of adding the catalyst will be presently described, but first let it be observed that the newly added catalyst plus the remainder of the original catalyst not separated, together with the reaction products, are withdrawn overhead through line 72 and passed into a cyclone separator 75 where the bulk of the quenching catalyst and the catalyst not previously removed are separated from the vapors. The separated catalyst passes into a receiving hopper 78 and in this hopper is at a temperature of about 1000° F. to about 1050° F. One stream of catalyst is withdrawn from hopper 78 through line 80, which carries pipes 81 for the introduction of fluidizing gas and communicates at its lower end with standpipe 25, as shown. The other stream of catalyst is withdrawn through line 82 carrying a flow control valve 83 at its lower end and inlet pipes 85 for fluidizing gas and thence discharged into bend 84 where it is mixed with a gas such as methane discharged into 84 through pipe 85, and thereafter the catalyst is passed upwardly through line 90 through a heat exchanger 95 where the catalyst is cooled to a temperature such that when withdrawn through line 100 it is at a temperature of about 600° F., whereupon it is injected into reaction mass in reactor 1 and thereafter carried upwardly in suspension into quenching chamber 70 previously mentioned.

The amount of catalyst recycled from hopper 78 to quenching chamber 70 will depend of course entirely on the amount of gas and catalyst flowing into chamber 70 and the temperature thereof. We have found that good results are obtained by recycling to zone 70 from hopper 78 sufficient catalyst so that a temperature of 1000°–1050° F. prevails in chamber 70. In any event, it is usually preferable to add sufficient catalyst to lower the temperature of the reaction mass to about 1000° F. or lower because at this temperature undesired side reactions are prevented and the decomposition of the desired butadiene is substantially prevented. The gases freed from catalyst in separator 75 are withdrawn through line 120 and these are preferably passed through a heat exchanger 122 where they are cooled to about 600° F., thence withdrawn through line 125 and passed into cyclone separator 130 where catalyst is separated and recycled to line 25 through line 132. The gases are drawn overhead from separator 130 through line 135 and pass through a Cottrell precipitator 140 where more catalyst is separated out and the separated catalyst is withdrawn through line 144 carrying flue gas inlets 145 for fluidizing purposes, and recycled through line 31 to regenerator 35. The reaction products now containing only minor amounts of catalyst are withdrawn from Cottrell precipitator 140 through line 150, thence further cooled in cooler 155, thence discharged through line 158 into an oil scrubber 160 where the last traces of catalyst are removed, the scrubbing oil being discharged into the washer through line 162. The washed gases are withdrawn through line 165, passed through entrainment separator 170 and thence to a pump 180 in which they are compressed and condensed prior to separation in a suitable system. The pressure conditions, i. e., the partial vacuum previously referred to in reactor 1 is maintained through pump 180 and suitable valves, in known manner.

Referring now to Fig. II for a detailed description of our improved reactor and its immediate accessory apparatus, it will be observed that the catalyst and the butylene enter the reaction vessel 1 and pass into the mixing chamber 24 and thence are delivered through a perforate member or screen S into a reaction space proper R limited circumferentially by cylinder 26 where the main reaction takes place, the catalyst and gas being in the form of a dense suspension resembling a liquid in flow characteristics. Disposed about the reaction chamber R are a plurality of cyclone separators which operate in the following manner:

A solid crown piece 30, having a base plate 31, forming together a confined space C is superimposed above cylinder 28 and the base plate 31, imperforate except for cylinders 29, causes the flow of suspension downwardly into a plurality of cylinders 27, (see Fig. I also) spaced in the form of a circle with their upper ends flush with, or in the plane of a plate 32, inperforate except in the regions of cylinder 26, cylinders 27 and 29. The catalyst in suspension flows through the cylinders 27, carrying vanes V which serve to cause turbulence, and the catalyst or the bulk of it gravitates to the space 36 at the bottom of the vessel 1. The gas or vapors, on the other hand, exit from cylinders 27, thence reverse their flow and pass upwardly through cylinders 29 projecting into the space above crown plate 30, and thereafter pass into quenching chamber 70.

Where it is desirable to maintain a short contact time between reactants and the catalyst, the catalyst in space R should be shallow and the base plate 31 should be disposed in close proximity to the top of cylinder 26. The actual dimensions of the distance between the plate 31 and the top of cylinder 26 will depend on the particular reaction, the density of the suspension as governed principally by the linear velocity of the gases in the reaction space R, and the particle size of the catalyst. For instance, in the case of butene dehydrogenation employing a catalyst having a size of from 200—400 mesh and where the contact time is of the order of a second or two, it is obvious that the plate 31 should be disposed merely a few inches above the top of cylinder 26 and that the mass of catalyst above the screen S should be no deeper than a few inches, and that the average velocity of the gas through the reaction space should be of the order of about 3–5 ft. per second. Of course, where the catalyst is steam insensitive and the substance may be mixed with reactants to lower the partial pressure of the reactants, the contact times may be somewhat longer since, for example, in the dehydrogenation of butylene to form butadiene there is much less danger of polymerization of the latter where the partial pressure of the latter is greatly reduced by dilution with steam.

The bulk of the catalyst, usually over 90%, is separated from the gases in reactor 1 in the manner indicated and gravitates to the bottom portion 36 of the reaction vessel, while the gases flow upwardly through outlet cylinders 29, thence through pipe 33 into quenching chamber 70. (See Fig. I or II.) The catalyst which is separated in the separators 27 collects in the bottom of the reaction vessel as indicated by the catalyst level line L, and is withdrawn from the said reactor.

As is known by those familiar with this particular art, the types of catalyst which may be employed for dehydrogenations are many and varied. One of these catalysts is metallic nickel. Heretofore, the difficulty with metallic nickel has been that it is so reactive that it is not usable because it not only accelerates the formation of, say, butadiene from butylene but attacks the butadiene to decompose it. In the type of operation which we have described herein, a very active catalyst such as inckel may be successfully employed because the combination of controlled contact time, finely divided catalyst and quenching features enables us to discontinue the reaction and to limit it to a very short period of time of contact between reactants and the nickel at reaction temperatures. In the case of other catalysts such as silica-alumina compositions, alumina-tungsten, alumina-chromium, alumina-molybdenum, the various metallic oxides, and the like, such as copper oxide, nickel oxide, cobalt oxide, or mixtures of the same where the catalyst is less active, our process is also of value not only from the standpoint of quenching the reaction but also from the standpoint of supplying at least a portion of the heat necessary for the reaction by recycling hot regenerated catalyst to the reaction zone.

To recapitulate, our present invention involves the concept of controlling accurately the contact time between a gaseous reactant and a solid catalyst, and while we have described the invention in detail in connection with the specific problem of dehydrogenating an olefin, obviously the inventive concept is applicable to a great number of processes, such as gas oil cracking, desulfurization, aromatization, oxidations, simple and destructive hydrogenations, chlorinations, and numerous other gas phase reactions where contact time is an important consideration from the standpoint of yields or for other reasons. It will be noted that according to our process, we prefer to quench the reaction mass by means of a cooled solid such as a solid catalyst added in sufficient quantity to lower the reaction mass to temperatures substantially below reaction temperatures, and since the process may be operated to quench the catalyst within the reaction zone very short contact times may be effected. On the other hand, if longer contact time between reactant and catalyst is desired, the quenching may be formed in a subsequent stage, say by adding cooled catalyst in line 72. It will be understood that instead of using catalyst to quench the reaction mass, we may use an inert solid such as sand, lime, or refractory material which is added in sufficient quantity and at a sufficiently lower temperature to effect the desired result.

Other features of our invention involve, as heretofore seen, an upflow standpipe arrangement for adjusting pressure differentials between the reaction zone and the regeneration zone; another feature involves furnishing at least a portion of the heat required for endothermic reactions by supplying the proper amount of heated catalyst. Finally, the catalyst flowing in the various means may be fluidized by steam as heretofore mentioned, or by the introduction of other gases such as methane, $CO_2$, CO, air, nitrogen, and the like; that is to say, these gases may be added through lines 60 and 20 and at other points in the system heretofore mentioned, to attain the desired fluidity of catalyst.

The pressure in reactor 1 may vary from about 100 mm. of mercury to above atmospheric pressure, subatmospheric pressure being preferred.

Many modifications of our invention will be obvious to those skilled in this particular art.

What we claim is:

1. Chemical reaction apparatus comprising in combination a hopper in elevated position and adapted to contain powdered solids, an elongated downflow standpipe extending from said hopper, a standpipe in communication with the downflow standpipe and arranged for upflow, at least one branch pipe adapted to discharge gas into each of said standpipes for fluidizing powdered solids therein, a reaction-chamber-containing vessel in elevated position, walls defining said reaction chamber in the upper portion only of said vessel, said upflow standpipe having an extension projecting into said vessel, an inlet conduit adapted to introduce gaseous material into said vessel, mixing means within said vessel, said mixing means receiving the end of the extension of said upflow standpipe carrying solids and the end of the conduit for introducing gaseous material into said vessel, whereby said solids and gaseous material are thoroughly mixed to form a suspension, means for passing the resulting suspension into the reaction chamber, a plurality of solid-gas separators disposed in the upper portion of said vessel adjacent said reaction chamber, said reaction chamber having an outlet in the upper portion thereof communicating with the inlets of the separators, conduit means extending from the upper portion of said vessel whereby gaseous material may be withdrawn after discharge from the separators, and conduit means extending from the bottom of said vessel whereby solids may be withdrawn.

2. Apparatus according to claim 1, in which the reaction chamber is centrally positioned in the vessel adjacent the top thereof, forming a space of restricted size with respect to the size of the vessel, and in which the separators are arranged about the reaction chamber.

3. Chemical reaction apparatus comprising in combination a reaction-chamber-containing vessel in elevated position, walls defining reaction chamber in the upper portion only of said vessel, a hopper in an elevated position for receiving finely divided catalyst, a downflow standpipe projecting from said hopper, an upflow standpipe projecting into said reaction chamber, said standpipes being in direct communication with each other and forming means for conveying powdered catalyst from the hopper to the reaction chamber, a plurality of spaced branch pipes in the standpipes and adapted to convey a gas thereinto for fluidizing finely divided catalyst flowing in said standpipes, a conduit for introducing a gaseous material into said reaction chamber permitting the formation therein of a dense phase suspension, a plurality of centrifugal separators in the upper portion of said vessel adjacent said reaction chamber, said reaction chamber having an outlet in the upper portion thereof communicating with the inlets of the separators, a conduit disposed at the top of said vessel and adapted to withdraw gaseous material therefrom, a secondary centrifugal separating means in communication with said last-named conduit and adapted to remove finely divided catalyst from gaseous material discharged thereby, a receiving hopper disposed below said secondary separating means a conduit connecting the solids outlet of the separator to said receiving hopper, a conduit connecting the last-named receiving hopper with the upper portion of said vessel, a cooling means disposed in said last-named conduit, said last-named conduit providing means whereby cooled catalyst may be returned to the uppermost portion of the vessel, and means projecting from the lowermost portion of the vessel for withdrawing catalyst.

4. Chemical reaction apparatus comprising in combination an elevated reaction-chamber-containing vessel, an elevated storage hopper for powdered catalyst, a downflow standpipe extending from the storage hopper and terminating in an upflow standpipe projecting into said vessel, thus forming a continuous path for powdered catalyst from said storage hopper to said vessel, at least one conduit connected with each of said standpipes and adapted to conduct a gas therein for facilitating the flow of powdered catalyst therein, mixing means disposed within said vessel and in communication with the end of the upflow standpipe, a gaseous reactant conduit in communication with said mixing means, means connecting the mixing means to the reaction chamber, a plurality of centrifugal separators disposed within said vessel at a point above said mixing means, said reaction chamber having an outlet in the upper portion thereof communicating with the inlets of the separators, an overhead conduit adapted to withdraw gaseous materials after discharge from the centrifugal separators, a bottom draw-off pipe adapted to withdraw catalyst from said vessel, regenerator, conduit means for conducting catalyst from said draw-off pipe to said regenerator, and conduit means for withdrawing regenerated catalyst and returning it to said storage hopper.

BRUNO E. ROETHELI.
WALTER G. SCHARMANN.

REFERENCES CITED

The following references are of record in the file of this patent:

UNITED STATES PATENTS

| Number | Name | Date |
|---|---|---|
| 1,626,664 | Brady | May 3, 1927 |
| 2,247,097 | Menshih | June 24, 1941 |
| 2,268,094 | Russell | Dec. 30, 1941 |
| 2,303,047 | Hemminger | Nov. 24, 1942 |
| 2,304,128 | Thomas | Dec. 8, 1942 |
| 2,311,564 | Munday | Feb. 16, 1943 |
| 2,327,175 | Conn | Aug. 17, 1943 |
| 2,337,684 | Scheineman | Dec. 28, 1943 |
| 2,373,008 | Becker | Apr. 3, 1945 |